US008862728B2

(12) United States Patent
Jayachandran et al.

(10) Patent No.: US 8,862,728 B2
(45) Date of Patent: *Oct. 14, 2014

(54) PROBLEM DETERMINATION AND DIAGNOSIS IN SHARED DYNAMIC CLOUDS

(75) Inventors: Praveen Jayachandran, Bangalore (IN); Bikash Sharma, State College, PA (US); Akshat Verma, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/586,058

(22) Filed: Aug. 15, 2012

(65) Prior Publication Data

US 2013/0305093 A1    Nov. 14, 2013

Related U.S. Application Data

(63) Continuation of application No. 13/470,589, filed on May 14, 2012.

(51) Int. Cl.
*G06F 15/173* (2006.01)
*G06F 11/00* (2006.01)

(52) U.S. Cl.
USPC ............................. 709/224; 709/226; 726/22

(58) Field of Classification Search
USPC ..................... 709/224, 226; 726/22
See application file for complete search history.

(56) References Cited

U.S. PATENT DOCUMENTS

| | | | |
|---|---|---|---|
| 6,073,089 A | 6/2000 | Baker et al. | |
| 7,403,850 B1 * | 7/2008 | Boutin et al. | 701/107 |
| 7,590,513 B2 | 9/2009 | Jiang et al. | |
| 7,647,524 B2 | 1/2010 | Ide et al. | |
| 2002/0177910 A1 | 11/2002 | Quarterman et al. | |
| 2007/0016687 A1 | 1/2007 | Agarwal et al. | |
| 2008/0097801 A1 * | 4/2008 | MacLellan et al. | 705/7 |
| 2008/0114581 A1 * | 5/2008 | Meir et al. | 703/13 |
| 2010/0061250 A1 | 3/2010 | Nugent | |
| 2010/0121609 A1 * | 5/2010 | Gorinevsky | 702/183 |
| 2011/0126197 A1 | 5/2011 | Larsen et al. | |
| 2011/0276951 A1 * | 11/2011 | Jain | 717/140 |
| 2013/0003567 A1 * | 1/2013 | Gallant et al. | 370/252 |
| 2013/0080375 A1 * | 3/2013 | Viswanathan et al. | 706/52 |
| 2013/0086203 A1 * | 4/2013 | Avner et al. | 709/217 |

OTHER PUBLICATIONS

Kannan et al. Elimination Based Fault Localization in Shared Resource Environments, Integrated Network Management (IM), 2011 IFIP/IEEE International Symposium on Issue Date: May 23-27, 2011.

Rao Jia, Autonomic Management of Virtualized Resources in Cloud Computing (2011), Wayne State University Dissertations, paper 358.

Wood et al., Disaster Recovery as a Cloud Service: Economic Benefits and Deployment Challenges, 2010.

(Continued)

*Primary Examiner* — Ebrahim Golabbakhsh

(74) *Attorney, Agent, or Firm* — Ryan, Mason & Lewis, LLP

(57) ABSTRACT

Techniques for problem determination and diagnosis in a shared dynamic cloud environment. A method includes monitoring each virtual machine and physical server in the shared dynamic cloud environment for at least one metric, identifying a symptom of a problem and generating an event based on said monitoring, analyzing the event to determine a deviation from normal behavior, and classifying the event as a cloud-based anomaly or an application fault based on existing knowledge.

11 Claims, 7 Drawing Sheets

(56) References Cited

OTHER PUBLICATIONS

IBM Tivoli, http://www.ibm.com/tivoli, downloaded Jul. 12, 2012, pp. 1.

H. Corporation, HP Openview http://www.openview.hp.com, downloaded Jul. 12, 2012, pp. 1-6.

Chen et al., Pinpoint: Problem Determination in Large, Dynamic Internet Services, in Dependable Systems and Networks, 2002, DSN 2002. Proceedings International Conference on, 2002, pp. 595-604.

Beal et al., The Infinite Hidden Markov Model, in Machine Learning, 2002, pp. 1-8.

Clarkson, Nearest-Neighbor Searching and Metric Space Dimensions, in Nearest-Neighbor Methods for Learning and Vision: Theory and Practice, G. Shakhnarovich, T. Darrell, and P. Indyk, Eds., 2006, pp. 1-45.

Verma et al., The Cost of Reconfiguration in a Cloud, in Proceedings of the 11th International Middleware Conference Industrial Track, ser. Middleware Industrial Track '10, ACM 2010, pp. 1-6.

Spec, Spec CPU 2006 Benchmark, http://www.spec.org/cpu2006, downloaded Jul. 12, 2012, pp. 1-2.

Hadoop, Open Source Mapreduce Implementation, http://hadoop.apache.org/ downloaded Jul. 12, 2012, pp. 1-3.

RUBiS, E-commerce Application, http://rubis.ow2.org downloaded Jul. 12, 2012, pp. 1-2.

Olio, Web 2.0 Application, http://incubator.apache.org/olio downloaded Jul. 12, 2012, pp. 1-3.

Ganglia Monitoring http://ganglia.info downloaded Jul. 12, 2012, pp. 1-4.

Nagios Website http://www.nagios.org downloaded Jul. 12, 2012, pp. 1-2.

Duan et al., Fa: A System for Automating Failure Diagnosis, in Data Engineering, 2009. ICDE '09. IEEE 25th International Conference on, 2009, pp. 1-12.

Agarwala et al., E2eprof: Automated End-to-End Performance Management for Enterprise System, in Dependable Systems and Networks, 2007. DSN '07. 37th Annual IEEE/IFIP International Conference on, Jun. 2007, pp. 749-758.

Agarwala et al., Sysprof: Online Distributed Behavior Diagnosis Through Fine-Grain System Monitoring, in Distributed Computing Systems, 2006. ICDCS 2006, 26th IEEE International Conference on, 2006, pp. 1-8.

Cohen et al., Correlating Instrumentation Data to System States: A Building Block for Automated Diagnosis and Control, in In OSDI, 2004, pp. 231-244.

Wang et al., Evaluation of Statistical Techniques for Online Anomaly Detection in Data Centers, ser. IM '11, 2011, pp. 1-9.

Gao et al., Modeling Probabilistic Measurement Correlations for Problem Determination in Large Scale Distributed Systems, in Distributed Computing Systems, 2009, ICDCS '09, 29th IEEE International Conference on, Jun. 2009, pp. 1-8.

Kang et al., Peerwatch: A Fault Detection and Diagnosis Tool for Virtualized Consolidation Systems, in Proceedings of the 7th International Conference on Autonomic Computing, ser. ICAC '10. New York, NY, USA: ACM, 2010, pp. 199-128.

Pelleg et al., Vigilant: Out-of-Band Detection of Failures in Virtual Machines, SIGOPS Oper. Syst. Rev., vol. 42, pp. 26-31, Jan. 2008.

Ben-Yehuda et al., Nap: A Building Block for Remediating Performance Bottlenecks Via Black Box Network Analysis, in Proceedings of the 6th International Conference on Autonomic Computing, ser. ICAC '09, 2009, pp. 1-10.

Cherkasova et al., Anomaly? Application Change? or Workload Change? Towards Automated Detection of Application Performance Anomaly and Change, in Dependable Systems and Networks with FTCS and DCC, 2008. DSN 2008. IEEE International Conference on, Jun. 2008, pp. 452-461.

KC et al., ELT: Efficient Log-Based Troubleshooting System for Cloud Computing Infrastructures, in IEEE International Symposium on Reliable Distributed Systems, Oct. 2011, pp. 1-10.

Hartigan et al. A K-means Clustering Algorithm, Applied Statistics, vol. 28, pp. 100-108, 1979.

Babu, Towards Automatic Optimization of Mapreduce Programs, in Proceedings of the 1st ACM Symposium on Cloud Computing, ser. SoCC' 10, 2010.

Wang, Ebat: Online Methods for Detecting Utility Cloud Anomalies, in Proceedings of the 6th Middleware Doctoral Symposium, ser. MDS'09, New York, NY, USA: ACM, 2009, pp. 4:1-4:6. Available: http://doi.acm.org/10.1145/1659753.1659757.

\* cited by examiner

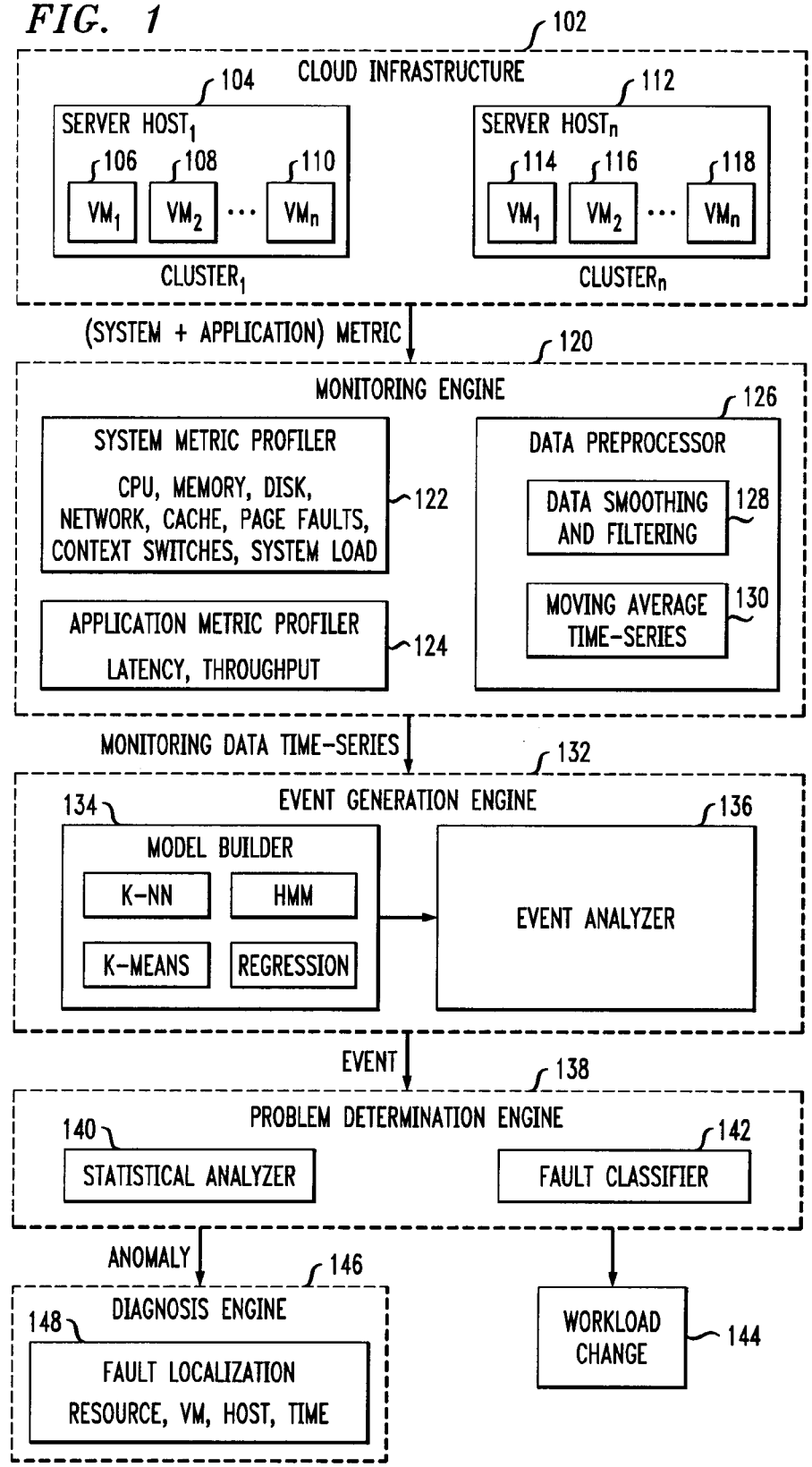

FIG. 2

| \[202 | | |
|---|---|---|
| FAULT PARAMETER IDENTIFIERS | | |
| RESOURCE HOG | CPU HOG | drop in cross-VM CPU correlations: increase in PM's avg. CPU utilization |
| | MEMORY HOG | drop in cross-VM memory correlations and increase in PM's avg. memory utilization |
| | DISK HOG | increase in avg. disk utilization at PM |
| | NETWORK HOG | drop in cross-VM correlations for network receive and transmit rates |
| | CACHE HOG | drop in cross-VM correlations across page faults; avg. increase in PM's cache hits/misses; drop in page-fault and context switch correlations on target VM |
| LIVE MIGRATION | LOADED SOURCE | drop in cross-VM correlations across page faults, context switches; drop in page-fault and context switch correlations for target VM; avg. increase in CPU and memory utilization (increase in memory utilization was relatively higher than that of CPU's) at source PM; increase in cache misses at source and destination PM (however the proportion increase here is less than that in source PM) |
| | LOADED DESTINATION | drop in cross-VM correlations across page faults, context switches; drop in page-fault and context switch correlations for target VM; avg. increase in CPU and memory utilization at target PM; increase in cache misses at source and destination PM (the proportion increase at destination PM is higher than that in source PM) |
| | MIGRATION+COHOSTED APPLICATION | drop in cross-VM correlations for CPU; avg. increase in latency |
| VM RESIZING | LOW SIZING | drop in cross-VM correlations for CPU and memory; avg. increase in CPU and memory utilization at target PM |
| | HIGH SIZING | slight decrease in avg. CPU and memory utilization at target VM; decrease in avg. latency |
| VM RECONFIGURATION | VM LIVE MIGRATION + DYNAMIC VM RESIZING | increase in avg. latency; drop in cross-VM correlations for memory and CPU |
| WORKLOAD CHANGE | INTENSITY INCREASE | avg. increase in CPU, memory and disk utilization at target VM; decrease in avg. latency |
| | INTENSITY DECREASE | avg. decrease in CPU and memory utilization at target VM; increase in avg. latency |

FIG. 3

```
<event-list>
  <fault>
    <name = "loaded destination live-migration"> </name>
    <category = "live-migration"> </category>
    <description>
      VM migration to a loaded host.
    </description>
    <signature>
      <VM-env>
        <CPU-corr-diff-thr>
            <VM1-VM4>24.8</VM1-VM4>
        </CPU-corr-diff-thr>
        <memory-corr-diff-thr>
          <VM1-VM4>16.6</VM1-VM4>
        </memory-corr-diff-thr>

<VM1-VM4>34.6</VM1-VM4>

</VM-env>
      <Operating-env-destination>
        <Avg.CPU-diff-thr>21</Avg.CPU-diff-thr>
        <Avg.memory-diff-thr>18.6</Avg.memory-diff-thr>
        <cachehit-diff-thr>33.1</cachehit-diff-thr>
        <cachemiss-diff-thr>32.2</cachemiss-diff-thr>
      </Operating-env-destination>
      <Hypervisor-env>
        <message>slow live migration</message>
      </Hypervisor-env>

<Application-env>
        <latency-diff-thr>6.6</latency-diff-thr>
      </Application-env>
    </signature>
  </fault>
  <fault>
```

```xml
<name>wrong VM resizing</name>
<category>VM resizing</category>
<description>
  VM wrongly resized.
</description>
<signature>
 <VM-env>
   <CPU-corr-diff-thr>
  <VM1-VM4>41.1</VM1-VM4>
   </CPU-corr-diff-thr>
   <memory-corr-diff-thr>
  <VM1-VM4>34.2</VM1-VM4>
   </memory-corr-diff-thr>
   <context-switches-corr-diff-thr>
  <VM1-VM4>27.7</VM1-VM4>
   </context-switches-corr-diff-thr>
 </VM-env>
 <Application-env>
   <latency-diff-thr>5.2</latency-diff-thr>
 </Application-env>
</signature>
</fault>
<change>
 <name>input size change</name>
 <category>workload change</category>
<description>Input size is changed</description>
<signature>
 <Operating-env>
   <Avg.CPU-diff%>34.2</Avg.CPU-diff%>
   <Avg.memory-diff%>21.1</Avg.memory-diff%>
 </Operating-env>
 <Application-env>
   <latency-diff%>21.3</latency-diff%>
 </Application-env>
</signature>
 <change>
</event-list>
```

| SYSTEM METRICS | DESCRIPTION | MEASUREMENT LEVEL |
|---|---|---|
| CPU-USER | % CPU TIME IN USER-SPACE | VM, HOST |
| CPU-SYSTEM | % CPU TIME IN KERNEL-SPACE | VM, HOST |
| MEMUSED | % OF USED MEMORY | VM, HOST |
| HIT/S | # OF REPLY CACHE HITS PER SECOND | HOST |
| MISS/S | # OF REPLY CACHE MISSES PER SECOND | HOST |
| CTXT | CONTEXT SWITCHES PER SECOND | VM |
| ETH-RXBYT | NETWORK BYTES RECEIVED PER SECOND | VM |
| ETH-TXBYT | NETWORK BYTES TRANSMITTED PER SECOND | VM |
| PGPGIN | KBytes PAGED-IN FROM DISK PER SECOND | VM |
| PGPGOUT | KBytes PAGED-OUT FROM DISK PER SECOND | VM |
| FAULT | PAGE FAULTS PER SECOND | VM |
| APPLICATION METRICS | DESCRIPTION | MEASUREMENT LEVEL |
| LATENCY | RESPONSE TIME | VM |
| THROUGHPUT | # OF TRANSACTIONS/SECOND | VM |

| CLOUD ANOMALIES | NON-CLOUD ANOMALIES |
|---|---|
| WRONG VM RESOURCE SIZING | MISCONFIGURED APPLICATION |
| IMPACT DUE TO SHARING | PERFORMANCE ANOMALY |
| ANOMALOUS VM LIVE MIGRATION | WORKLOAD MIX CHANGE |
| VM RECONFIGURATION | WORKLOAD INTENSITY CHANGE |
| VM TO VM CONTENTION | HARDWARE ERROR |

PROBLEM DETERMINATION AND DIAGNOSIS IN SHARED DYNAMIC CLOUDS

CROSS-REFERENCE TO RELATED APPLICATIONS

This application is a continuation of U.S. patent application Ser. No. 13/470,589, filed May 14, 2012, incorporated by reference herein.

FIELD OF THE INVENTION

Embodiments of the invention generally relate to information technology, and, more particularly, to virtualization technology.

BACKGROUND

Large data centers can experience frequent faults, and are a prominent contributor to data center management costs. Data centers can generate considerable monitoring data, but detecting faults and corresponding root causes from this data is difficult. Typically, this task is performed by manually observing data, using pre-defined thresholds.

Also, a virtualized cloud environment introduces new challenges including shared resources, dynamic operating environments with migration and resizing of virtual machines (VMs), varying workloads, etc. Shared resources compete for cache, disk and network resources, and challenges exist in differentiating between performance issues due to contention and application faults across several resources. Dynamism challenges exist in differentiating between performance anomalies and workload changes.

Virtualization is increasingly used in emerging cloud systems. Occurrences of various anomalies or faults in such large-scale setups contribute significantly to total management costs, along with performance deterioration of the underlying applications. Accordingly, a need exists for efficient fault management techniques for dynamic shared clouds that can distinguish cloud related anomalies from application faults.

SUMMARY

In one aspect of the present invention, techniques for problem determination and diagnosis in a shared dynamic cloud environment are provided. An exemplary computer-implemented method for problem determination and diagnosis in shared dynamic clouds can include steps of monitoring each virtual machine and physical server in the shared dynamic cloud environment for at least one metric, identifying a symptom of a problem and generating an event based on said monitoring, analyzing the event to determine a deviation from normal behavior, and classifying the event as a cloud-based anomaly or an application fault based on existing knowledge.

In another aspect of the invention, a system for problem determination and diagnosis in a shared dynamic cloud environment is provided. The system includes a memory, at least one processor coupled to the memory, and at least one distinct software module, each distinct software module being embodied on a tangible computer-readable medium. The software modules include a monitoring engine module, executing on the processor, for monitoring each virtual machine and physical server in the shared dynamic cloud environment for at least one metric and outputting a monitoring data time-series corresponding to each metric, an event generation engine module, executing on the processor, for identifying a symptom of a problem and generating an event based on said monitoring, a problem determination engine module, executing on the processor, for analyzing the event to determine and locate a deviation from normal behavior, and a diagnosis engine module, executing on the processor, for classifying the event as a cloud-based anomaly or an application fault based on existing knowledge.

In yet another aspect of the invention a method for determining virtual machine behavior under multiple operating environments in a system includes monitoring at least one resource at the level of each virtual machine in a system, monitoring aggregate usage of each resource at the level of a physical host in the system, capturing multiple metrics governing cumulative usage of each resource over all virtual machines on each physical host in the system, and analyzing the metrics to determine virtual machine behavior under multiple operating environments in the system.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram illustrating system architecture, according to an embodiment of the present invention;

FIG. 2 is a table illustrating example fault signature parameters, according to an embodiment of the present invention;

FIG. 3 is a diagram illustrating a fault signature example, according to an embodiment of the present invention;

FIG. 4 is a table illustrating example system and application metrics, according to an embodiment of the present invention;

DETAILED DESCRIPTION

Figures 5, 6:
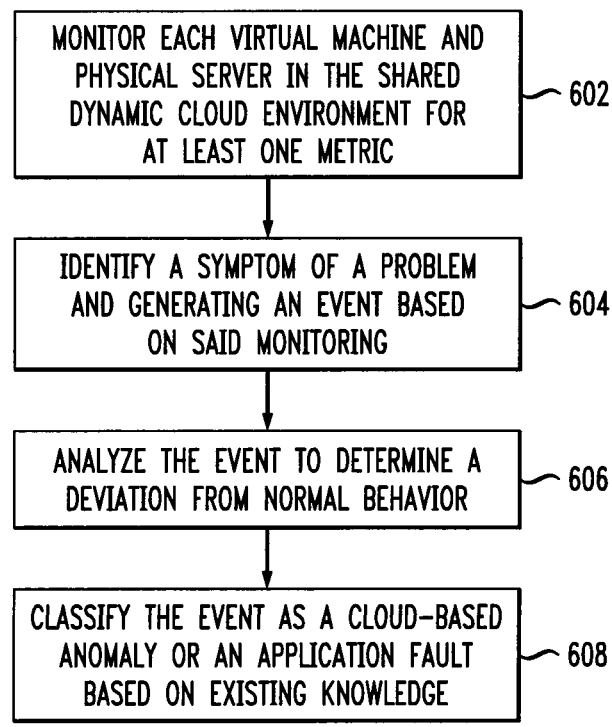
FIG. 5 is a table illustrating detected fault scenarios, according to an embodiment of the present invention.
FIG. 6 is a flow diagram illustrating techniques for problem determination and diagnosis in a shared dynamic cloud environment, according to an embodiment of the invention.

As described herein, an aspect of the present invention includes problem determination and diagnosis in shared dynamic clouds. At least one embodiment of the invention includes a three-stage approach to identify faults as early as possible, with limited training or application knowledge.

After initial detection and fault localization in terms of virtual machines and resources affected, a diagnosis engine uses expert-defined fault signatures to classify the fault into one of several types, both cloud-related and application-related. As detailed herein, the architecture of at least one embodiment of the invention allows the system to be extended to new applications, monitored metrics and analysis techniques.

Accordingly, embodiments of the invention include differentiating cloud-related anomalies from application faults. By way of example, cloud-related anomalies can include incorrect virtual machine (VM) sizing, impact due to sharing, and reconfiguration and/or migration. Non-cloud/application faults can include, for example, a mis-configured application, software bugs, hardware failure, a workload change, and an application or operating system (OS) update.

Additionally, as described herein, at least one embodiment of the invention includes facilitating adaptation to rapid changes in an environment by using operating context information together with monitored VM, resource and application metrics. Additionally, in an example embodiment of the invention, results from different analysis techniques can be combined to improve accuracy.

As detailed further herein, monitoring data can include monitoring various system and application metrics such as central processing unit (CPU), memory utilization, cache hit/miss rate, disk read/write, network utilization, page faults, context switches for each VM, end-to-end latency, etc. Each data metric can be represented as a moving average time series after preprocessing, and a standard format allows extension of problem detection techniques to new metrics. Monitoring can also encompass an operating environment, including the context in which an application executes to capture co-located applications. Characterizations can also be made using physical hosts' CPU, memory, cache, network usage, etc.

As noted, at least one embodiment of the invention includes a three-stage approach for problem determination and robust diagnosis. In such example embodiments, the first stage identifies potential symptoms of anomalous behavior and generates events, with each event pinpointing a particular VM and resource involved. The second stage further analyzes each event by calculating correlations across other resources on the VM involved, and across other VMs running the same application for the resource involved. The third diagnosis stage identifies any significant deviations in the correlation values from normal application behavior to classify the fault into one of multiple cloud-related and/or application-related anomalies. Accordingly, extensive diagnosis is triggered when a deviation from normal behavior is detected by the light-weight event generation stage.

At least one embodiment of the invention can include treating an application as a black box and requires limited or no training to handle new applications. Unlike many existing problem determination approaches that monitor one or two resources only (such as CPU and memory), at least one embodiment of the invention includes monitoring a wide range of resources including CPU, memory, cache, disk and network, which enable detection and localization of several classes of faults with accuracy.

Further, at least one embodiment of the invention system is automated and requires manual intervention only when an anomaly is flagged. The system indicates the potential source of the problem for restoration.

The diagnosis stage of at least one embodiment of the invention relies on expert knowledge to accurately classify faults. Expert knowledge can be made available, for example, through standardized fault signatures, which capture the characteristics of how each fault manifests as deviations from normal behavior in different metric data. When abnormal behavior is detected, the nature of the deviations from normal behavior is matched with the various fault signatures available to classify the fault. The fault signatures can be expressed in a standardized extensible markup language (XML) format, and an expert can add or edit knowledge of fault scenarios for future classification.

Another notion described herein is that of operating environment. Accordingly, to accurately detect faults in a system, at least one embodiment of the invention includes monitoring various resources at the level of each VM, as well as the aggregate usage of each resource at the level of a physical host. The operating environment captures metrics governing the cumulative usage of resources over all VMs on each physical host. It is possible for a particular VM's behavior to be normal under one operating environment, but abnormal under another operating environment.

By way of example, consider a VM running an application with latency that is more than what is normal and/or acceptable. The memory utilization on the VM is high, and the physical server hosting the VM reveals high page faults and cache misses. This information alone may not reveal the nature of the problem, as this could be due to a high workload, an application related anomaly, or a live VM migration from one server to another. Analyzing the operating context will help identify the problem. A live VM migration will manifest as high page faults and cache misses both on the source as well as the destination server, and other VMs and servers hosting the same application will be unaffected. The effect will also be temporary until the migration completes, after which application performance should return to normal. An application anomaly will only affect the server hosting the VM, and other VMs running the same application will be unaffected. An increased workload will affect all VMs running the same application and will be revealed through correlations across VMs.

FIG. 1 is a diagram illustrating system architecture, according to an embodiment of the present invention. By way of illustration, FIG. 1 depicts a cloud infrastructure 102 including multiple clusters. For example, one cluster is illustrated as server host 104, which includes VMs 106, 108 and 110, while another cluster is illustrated as server host 112, which includes VMs 114, 116 and 118.

FIG. 1 also depicts system components including a monitoring engine 120, an event generation engine 132, a problem determination engine 138 and a diagnosis engine 146. As described herein, a monitoring engine 120 monitors each virtual machine and physical server for various metrics including CPU, memory, cache, network, and disk resources. An event generation engine 132 identifies a potential symptom of a fault and generates an event. A problem determination engine 138 analyzes the event to determine deviations from normal behavior, and a diagnosis engine 146 classifies the anomaly based on expert knowledge. In connection with the depiction of FIG. 1, each of the stages is described further below.

As noted, the monitoring engine 120 collects and processes various system and application metrics pertaining to CPU, memory, cache, network and disk resources, for every virtual machine and physical server. In particular, the system metric profiler module 122 collects metrics and passes them on to the data preprocessor module 126 which performs certain filtering and smoothening actions via sub-module 128. The pre-processing removes erroneous outlier values and smoothes any kinks in the data by taking an average of samples over a moving window via sub-module 130. Additionally, the monitoring engine 120 also includes an application metric profiler module 124 for collecting application metrics.

As anomalous behavior can only be identified as a trend and not from any single sample value, algorithms in at least one embodiment of the invention work with time series data. A data-point, defined herein as a sequence of moving average values over a fixed interval of time, forms the basic input unit for anomaly detection algorithms in at least one embodiment of the invention. Over time, several data-points are generated for each metric that is monitored. Accordingly, the output of the monitoring engine 120 is a stream of data-points, each data-point being derived from a monitoring data time series, corresponding to each system and application metric. Additionally, the system can accommodate monitoring new metrics that are expressed as similar time-series data.

Consider the following example regarding the construction of data-points from time-series data. Assume starting with the following twelve samples of CPU utilization: {34.2, 26.8, 32, 27.7, 38.2, 29, 30.1, 28.3, 33.5, 31.1, 27.8, 39}. Next, a moving average is obtained over a window size (for example, w=3): {31, 33, 28.8, 32.6, 32.4, 29.1, 30.6, 30.9, 30.8, 32.6, 30.3, 29.6}. Then, data points are extracted from the above moving average time-series data. For example, if the interval length of each data point is defined as k=4, the following three points are obtained: [31, 33, 28.8, 32.6], [32.4, 29.1, 30.6, 30.9], and [30.8, 32.6, 30.3, 29.6].

It is to be noted that the system metrics are collected separately at the levels of virtual machines and physical hosts. This is because some resources such as CPU and memory are typically partitioned amongst the VMs residing on a physical host, while other resources such as the cache are shared. In order to capture the context or the state of the physical host on which a particular VM is running, at least one embodiment of the invention includes defining the notion of an operating environment. As noted above, the operating environment captures metrics governing the cumulative usage of resources over all or several VMs on each physical host. For instance, this can include the total CPU and memory utilization of each of the physical hosts (across all of their hosted VMs) and cache hit rate. For example, in a case of a live VM migration that results in anomalous application behavior (for example, large application latency), it can be observed that the cache hits/misses and page faults at the physical server hosting the faulty VM is deviant (abnormal) from those at other physical servers, hosting other VMs running the same application.

As noted, the event generation engine 132 identifies potential symptoms of anomalous behavior and triggers an event with information regarding the specific VM(s) and resource(s) that may be deviating from normal behavior. The generation of an event may not immediately denote the presence of a fault, but may merely suggest the possibility of one. Further analysis can be needed to confirm if a fault is present, and if so, to classify it. For instance, a heavy workload to an extent never seen before (yet non-faulty) may trigger an event because a VM's memory utilization is unusually high. Further analysis (performed by the problem determination engine 138) may reveal that this is, however, in correlation with high utilizations of other resources such as CPU and disk or other VMs running the same application, and therefore merely pinpoints to a high workload scenario and not a fault.

To reiterate, the role of the event generation engine 132 is to pinpoint the location of potential abnormal behavior so that further analysis can be conducted to analyze the particular VM(s) and resource(s) in question. This facilitates at least one embodiment of the invention scaling to large systems generating huge amounts of monitoring data. Additionally, the event generation engine 132, via model builder module 134, builds a model of normal application behavior by leveraging one of several machine learning techniques. The models are used to detect deviations in the observed data from normal behavior and trigger events to output to an event analyzer module 136.

The model builder module 134 can implement modeling techniques such as Hidden Markov Models (HMM), nearest-neighbor, K-means and statistical techniques such as regression techniques. The modeling techniques attempt to qualitatively and/or quantitatively measure the extent of deviation between the analyzed data-point and past observations. The architecture of at least one embodiment of the invention allows plug-and-play of any modeling technique as part of the event generation engine 132.

By way of example, HMM-based modeling involves training a HMM using a multitude (for example, hundreds) of data points, leading to the model capturing a notion of normal behavior. As the application behavior may change with load or workload mix, at least one embodiment of the invention includes training multiple HMMs for different scenarios (wherever knowledge of typical application workload scenarios is available). If this step is intended to be fast and have a low overhead, the number of HMMs created can be limited. A new test data point can be fed to the HMM to determine how well it fits the model. An advantage of this approach is that the HMM can capture the sequence of data samples and not just the set of samples that comprise the data point.

Additionally, nearest-neighbor techniques include computing a distance measure between the data point under consideration and a given set of model data points. The set of model data points can be similar to the training set used for HMM modeling, or can be a certain number of data points chosen from the immediate or recent past. The latter approach will be able to compare the application's footprint over time and can detect variations at different time scales. Also, a larger distance measure will create a larger deviation from normal or expected behavior. Note that this technique does not require any form of training.

The distance metric can be chosen from one of several example alternatives: a simple vector difference between corresponding samples in the two data points, the difference between aggregate statistics computed from individual samples (such as average and standard deviation), distance in Euclidean space, any combination of these measures, etc. Unlike the HMM, the distance measure provides a quantitative measure of the extent of deviation observed in the system.

Further, several statistical techniques have been developed to analyze continuous data. For example, well known regression techniques can be used to develop a model for normal behavior, and any new data point can be compared with this model to determine a fit. This will indicate whether the data point fits the model, or if not, by how much the data point deviates from the model. Other statistical tests can include, for instance, goodness-of-fit tests or threshold-based tests. Additionally, statistical techniques can be applied to histograms derived from the data points instead of being applied to the data points themselves.

As noted above, the problem determination engine 138, which includes a statistical analyzer module 140 and a fault classifier module 142, uses statistical correlation across VMs and resources to identify anomalies and localize them to the affected resource(s) and VM(s). For every event generated by the event generation engine 132, this stage analyzes the data further to identify anomalies. Accordingly, in at least one embodiment of the invention, the problem determination engine 138 is not invoked unless an event is generated. By way of example, assume that an event is generated for metric $M_j$ on VM $VM_i$. This stage then computes correlations between data for $M_j$ and data for every other metric on $VM_i$, as well as correlations between data for $M_j$ on $VM_i$ and data for $M_j$ on every other VM running the same application (wherever the information is available). Based on knowledge of typical correlation values under normal behavior, any significant deviations from normal correlation values are noted. These deviations are fed to the diagnosis engine 146 for classification into different classes of faulty and non-faulty behavior based on expert knowledge.

By way of illustration, let $T_{training}$ denote the time-series containing training data points over some time window $W_{tr}$. $T_{test}$ represents the time-series of test data points over some window $W_{te}$, such that the number of data points in $T_{test}$ is less than or equal to the number of data points in $T_{training}$. The training and test data time-series are merged together to produce the correlation sample time-series, denoted as $T_{correlation}$. Note that each system metric on each VM will have a corresponding time-series. Let vm and r denote the virtual machine and system metric, respectively. The notation $T_{X-vm-r}$ is used to denote the time-series X (where X can be a training, test or sample time-series) of system metric r for virtual machine vm. Next, the correlation (c1) between $T_{correlation-vm1-r}$ and $T_{correlation-vm2-r}$ is computed, as is similar correlation (c2) between $T_{training-vm1-r}$ and $T_{training-vm2-r}$ time-series. The resulting correlation values (c1 and c2) are compared against each other to identify the event. (c2) is used as a threshold (T) to determine the event as workload intensity changes (when abs(c1−c2)≤T) or an anomaly (when abs(c1−c2)>T).

The above process is robust to changes in workload, as any change in workload (such as depicted via component 144 in FIG. 1) will not significantly affect correlations across VMs running the same application; that is, the CPU and memory utilizations of all VMs will increase with an increase in workload. In contrast, if there is an anomaly affecting one particular VM and resource, this will be reflected in a metric governing the resource no longer being correlated with other VMs running the same application.

The total number of correlations computed in this process is the number of metrics plus the number of VMs running the application. Note that at least one embodiment of the invention includes analyzing the neighborhood of the location where an event is generated. This helps to scale to large system sizes and several metrics monitored.

The diagnosis engine 146, which includes a fault localization module 148, uses pre-defined expert knowledge to classify the potentially anomalous scenario detected by the problem determination engine 138 into one of several faulty and non-faulty classes. The expert knowledge can be made available to the system in the form of standardized fault signatures. A fault signature captures a set of deviations from normal behavior, both in the correlation values computed by the problem determination engine 138 as well as in the operating environment, that are characteristic of the fault they describe. When anomalous behavior is detected, an attempt is made to match the deviations from normal behavior with one or more known fault signatures. If a match is found, the diagnosis engine 146 will successfully classify the fault. If no match is found, the diagnosis engine will flag the behavior as anomalous behavior of which it does not have knowledge. FIG. 2 describes characteristics of types of fault that help at least one embodiment of the invention to differentiate different kinds of fault scenarios.

FIG. 2 is a table 202 illustrating example fault signature parameters, according to an embodiment of the present invention. At least one embodiment of the invention adopts an XML format for describing the fault signatures so as to allow extensibility for new fault signatures to be added (for example, by a system expert) as and when the system detects faults. Thus, at least one embodiment of the invention system can learn to classify new kinds of faults with expert assistance. An assumption that can be made in connection with at least one embodiment of the invention is that each fault has a characteristic signature and that the signature can be expressed in terms of the metrics monitored.

FIG. 3 is a diagram illustrating a fault signature example 302, according to an embodiment of the present invention. By way of illustration, FIG. 3 depicts examples of expert-created signatures for two types of faults and one workload change scenario. The signatures are described using different contexts expressed as tags. Only the metrics that deviate from normal behavior are captured in the signature and are expressed as thresholds denoting that the minimum deviation in the correlation values required for a match with the signature.

For example, a pairwise CPU correlation is computed across all VMs hosting an application. The deviation in correlation values from normal behavior has to be at least as large as the threshold defined as (CPU-corr-thr) to match this signature. The different context tags used include: (a) VM environment context captures the fault manifestation at the virtualized resources level; (b) operating environment context captures the metrics obtained at the physical host representing aggregate usage across all VMs residing on the host; (c) hypervisor context captures any special log messages obtained from the hypervisor; and (d) application context captures application level performance metrics.

A fault signature can include one or more of these context tags that characterize the fault it defines, and allows at least one embodiment of the invention to uniquely identify it. Example signatures for faults and workload change are depicted in FIG. 3. Live migration faults are differentiated from other faults based on source and destination host page faults (operating context), while a wrong VM sizing is identified using significant deviations in CPU, memory, and number of context switches. Different fault signature identifiers that aid at least one embodiment of the invention in identifying and classifying each category and sub-category of faults are summarized in FIG. 2.

As detailed herein, at least one embodiment of the invention includes monitoring various system and application metrics and detect various faults. Accordingly, FIG. 4 is a table 402 illustrating example system and application metrics, according to an embodiment of the present invention. As noted herein, at least one embodiment of the invention includes a monitoring engine that collects measurements from physical hosts and overlying virtual machines for fault detection and diagnosis. The measurement data can span multiple system and application metrics. Table 402 in FIG. 4 lists a set of system metrics monitored by at least one embodiment of the invention. The third column of Table 402 specifies whether the metric is collected at the VM level or at the physical server level.

FIG. 5 is a table 502 illustrating detected fault scenarios, according to an embodiment of the present invention. By way of illustration, FIG. 5 describes various kinds of faults detected using at least one embodiment of the invention. Details of example faults are described below.

In the fault of "Wrong VM resource sizing," the VM resource allocation (CPU and memory) is mis-configured. Consider the following misconfiguration scenarios: (a) both CPU and memory reservation for the target VM are assigned very low values; (b) CPU reservation is configured with a very low value, while memory reservation is a valid value; and (c) memory reservation is set to a very low value, while CPU reservation has a valid value.

A fault of "Faulty VM live migration" reflects the problems that might arise due to live migration of virtual machines. Consider the following two scenarios. In the first scenario, a VM is migrated to a heavily congested physical host. The physical host has just enough capacity to accommodate the migrated VM. In the second scenario, a VM is migrated from a heavily congested source host where there is insufficient resources to perform the migration.

A "Workload mix change" fault corresponds to changing the workload mix or the nature of the workload, which changes the extent to which different resources are utilized by the application. A "Workload intensity change" fault indicates an increase or decrease in the intensity of the workload, while the nature of the workload itself remains the same.

An "Application misconfiguration" fault denotes a case where one of the application parameters has been set to an incorrect or invalid value. Also, a "VM configuration error" captures the situation when a virtual machine is configured in a way that conflicts with some configuration parameters of the physical host. For example, if the CPUs on the source and destination hosts do not provide the same set of features to the virtual machines, activities such as VM live migration fail.

A "VM reconfiguration" can arise during VM reconfiguration, which can be achieved in a shared cloud either by dynamic VM resizing, VM live migration or via creating new VM instances. An "Impact due to resource sharing" fault is a situation where two or more VMs hosted on the same physical machine contend for a resource and one or more of the VMs performance is affected. For instance, consider a cache-hungry application on one VM co-hosted with a cache-sensitive application on another VM. The cache-hungry VM uses the cache aggressively, significantly affecting the cache hit-rate and performance of the other application. Referred to herein as CPU-hog, this represents a scenario where the application has gone into an infinite loop computation that is hogging (that is, consuming a large extent of) the CPU. This fault can be injected by introducing a piece of C code that performs floating point computations in an infinite loop. This consumes most of the VM's available processor cycles, leading to poor application performance.

Referred to herein as memory-hog, this represents a scenario where there is a memory leak in the application. This is implemented by running a C program that consumes a lot of memory (it continuously reserves memory from heap via malloc without releasing the allocated chunks) on the target VM. The application is left with very little memory, leading to a significant drop in application throughput.

Also, referred to herein as disk-hog, this situation is similar to the CPU and memory hog scenarios, and can be implemented using multiple Hadoop sort instances running in parallel to create a high disk utilization scenario.

Referred to herein as network-hog, in this fault, the network link is heavily utilized. Additionally, referred to herein as cache-hog, in this fault, a cache-intensive benchmark is co-located with the target VM to simulate cache-hog.

FIG. 6 is a flow diagram illustrating techniques for problem determination and diagnosis in a shared dynamic cloud environment, according to an embodiment of the present invention. Step 602 includes monitoring each virtual machine and physical server in the shared dynamic cloud environment for at least one metric. Metrics can include metrics pertaining to central processing unit, memory, cache, network resources, disk resources, etc. Monitoring can additionally include outputting a stream of data-points, each data-point being derived from a monitoring data time series, corresponding to each system and application metric in the shared dynamic cloud environment. Further, in at least one embodiment of the invention, monitoring includes monitoring separately at levels of virtual machine and physical host.

Step 604 includes identifying a symptom of a problem and generating an event based on said monitoring. Identifying a symptom can include identifying a trend from time series data. Additionally, at least one embodiment of the invention includes building a model of normal application behavior by leveraging a machine learning technique, as well as using the model to detect a deviation in the monitored data from normal behavior.

Step 606 includes analyzing the event to determine a deviation from normal behavior. Analyzing can include using statistical correlation across virtual machines and resources to pinpoint the location of the deviation to an affected resource and virtual machine. Also, at least one embodiment of the invention includes analyzing an area surrounding a location where the event is generated.

Step 608 includes classifying the event as a cloud-based anomaly or an application fault based on existing knowledge. The existing (or expert) knowledge can include a fault signature, wherein a fault signature captures a set of deviations from normal behavior that are characteristic of an event. Additionally, at least one embodiment of the invention includes matching the deviation from normal behavior with a fault signature when an event is generated, and further classifying the event if a match is found, and flagging the event as anomalous behavior if a match is not found.

As also described herein, at least one embodiment of the invention includes determining virtual machine behavior under multiple operating environments in a system. This can include, for example, monitoring at least one resource at the level of each virtual machine in a system, monitoring aggregate usage of each resource at the level of a physical host in the system, capturing multiple metrics governing cumulative usage of each resource over all virtual machines on each physical host in the system, and analyzing the metrics to determine virtual machine behavior under multiple operating environments in the system. Additionally, at least one embodiment of the invention can include detecting a problem in the system based on the virtual machine behavior under multiple operating environments.

The techniques depicted in FIG. 6 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components detailed herein. In an aspect of the invention, the modules can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 7:
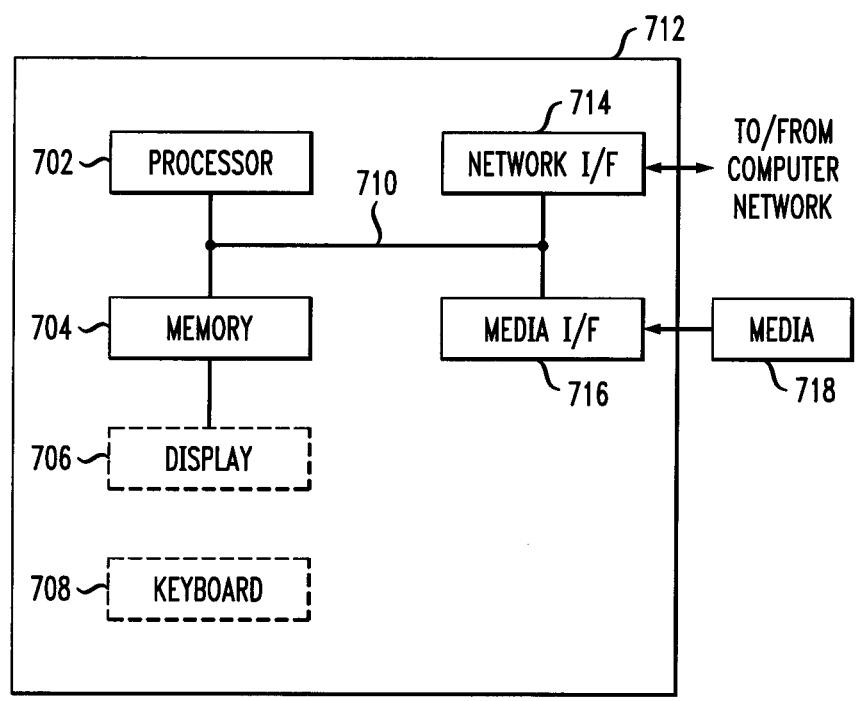
FIG. 7 is a system diagram of an exemplary computer system on which at least one embodiment of the invention can be implemented.

Additionally, an aspect of the present invention can make use of software running on a general purpose computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, creating signatures of cloud reconfiguration activity to handle virtualization-driven reconfiguration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for problem determination and diagnosis in a shared dynamic cloud environment during live virtual machine migration, the method comprising:

monitoring each virtual machine and each physical server in a shared dynamic cloud environment for at least one metric;

identifying a symptom of a problem within the shared dynamic cloud environment and generating an event based on said monitoring, wherein said event corresponds to said symptom;

analyzing the event to determine a deviation from normal behavior, wherein said normal behavior is determined based on said monitoring; and classifying the event as a cloud-based anomaly or an application fault based on a comparison of the event with multiple fault signatures, wherein said multiple fault signatures capture a set of deviations from normal behavior associated with (i) one or more cloud-based anomalies and (ii) one or more application faults, and wherein said set of deviations comprises information pertaining to a given virtual machine and a physical server hosting the given virtual machine in the shared dynamic cloud environment, and wherein said classifying comprises:

matching the deviation from normal behavior associated with the event with one of the one or more fault signatures based on the at least one monitored metric monitored for each virtual machine and for each physical server corresponding to said event;

wherein at least one of the steps is carried out by a computer device.

2. The method of claim 1, wherein the at least one metric comprises a metric pertaining to at least one of central processing unit, memory, cache, network resources and disk resources.

3. The method of claim 1, wherein said monitoring comprises outputting a stream of data-points, each data-point being derived from a monitoring data time series, corresponding to each system and application metric in the shared dynamic cloud environment.

4. The method of claim 1, wherein said monitoring comprises monitoring separately at levels of virtual machine and physical host.

5. The method of claim 1, wherein said identifying comprises identifying a trend from time series data.

6. The method of claim 1, comprising building a model of normal application behavior by leveraging a machine learning technique.

7. The method of claim 6, comprising using the model to detect a deviation in the monitored data from normal behavior.

8. The method of claim 1, wherein said analyzing comprises using statistical correlation across virtual machines and resources to pinpoint the location of the deviation to an affected resource and virtual machine.

9. The method of claim 1, comprising analyzing an area surrounding a location where the event is generated.

10. A method for determining virtual machine behavior under multiple operating environments during live virtual machine migration in a system, the method comprising:

monitoring at least one resource at the level of each virtual machine in a system;

monitoring aggregate usage of each resource at the level of a physical host in the system;

capturing multiple metrics governing cumulative usage of each resource over all virtual machines on each physical host in the system; and analyzing the metrics to classify virtual machine behavior as a cloud-based anomaly or an application fault under multiple operating environments in the system, wherein said analyzing comprises matching the metrics to one or more of multiple fault signatures, wherein said multiple fault signatures capture a set of deviations from behavior associated with (i) one or more cloud-based anomalies and (ii) one or more application faults, and wherein said set of deviations comprises information pertaining to a given virtual machine and a physical server hosting the given virtual machine in the system;

wherein at least one of the steps is carried out by a computer device.

11. The method of claim 10, comprising detecting a problem in the system based on the virtual machine behavior under multiple operating environments.

\* \* \* \* \*